Sept. 15, 1942.  A. NAGEL  2,295,801
TWO-SIZE CAMERA
Filed March 28, 1940
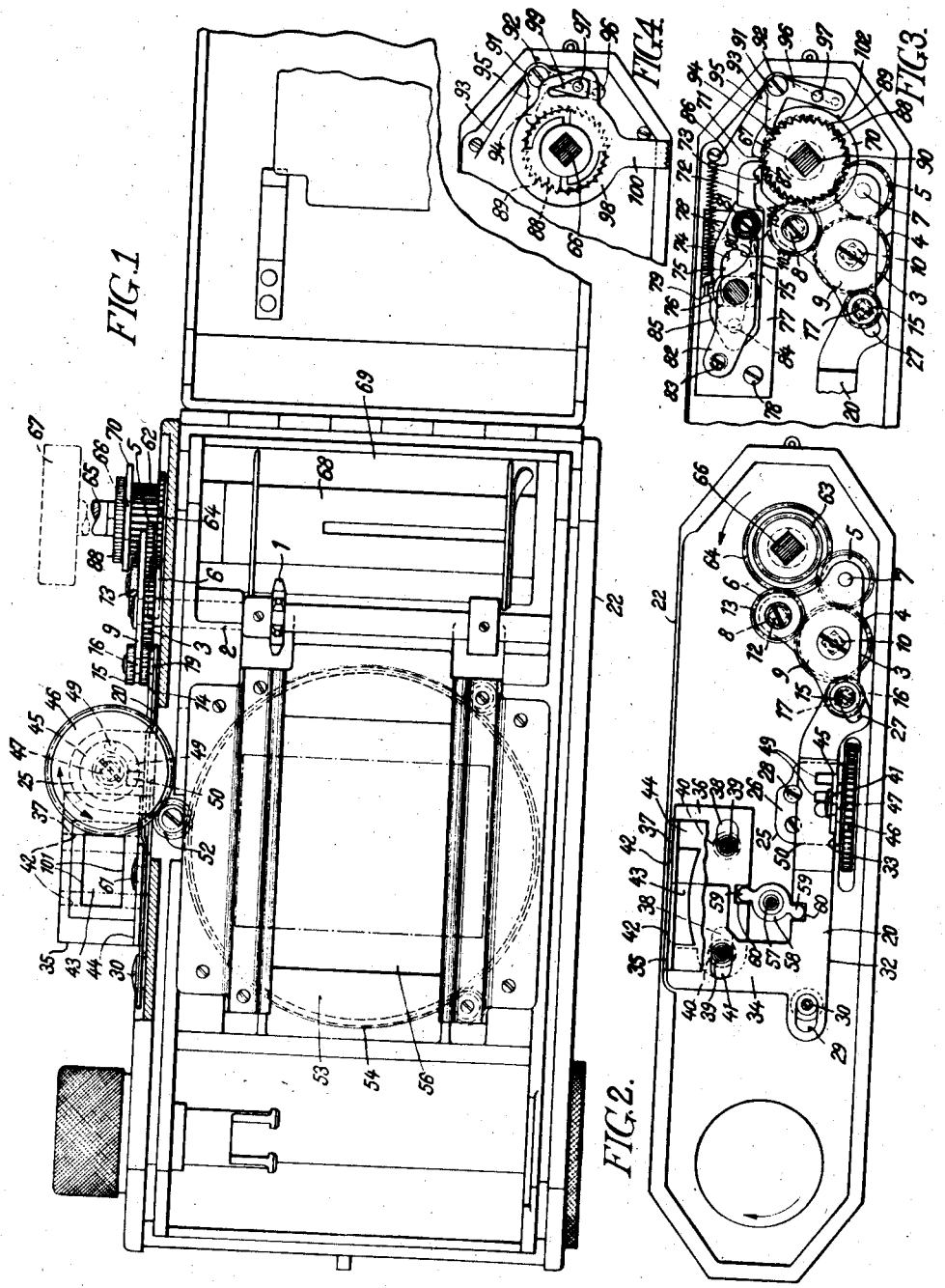
INVENTOR
August Nagel,
BY
ATTORNEYS Patented Sept. 15, 1942

2,295,801

UNITED STATES PATENT OFFICE 2,295,801

TWO-SIZE CAMERA

August Nagel, Stuttgart-Degerloch, Germany; vested in the Alien Property Custodian Application March 28, 1940, Serial No. 326,456
In Germany May 31, 1939

8 Claims. (Cl. 95—31)

The invention refers to a so-called two size cameras, i. e. cameras with the aid of which it is possible to take two different picture sizes on the same film. Several kinds of arrangements as such have already been suggested. Blind masks are known which can be adjusted from the outside and thereby permit more or less limiting of the picture size. With arrangements as such optional sizes can be adjusted, especially if the masks operate on the four sides of the picture size.

In practice, however, a more practical method has been found, namely to provide the arrangement only for two sizes, as on one hand photographing on optional sizes is not necessary on ordinary automatic cameras, and on the other hand it is always necessary to bring at least one side of the picture size in relation to the film width in order to make use of the film size to its full extent. For this purpose the camera is, for example, fitted with flaps which are swingable parallel to the film plane and perpendicular to the longitudinal axis of the film. These arrangements have the disadvantage that they require a certain minimum thickness of the camera housing so that generally they are only suitable for box cameras whereas the said flaps can be arranged only with difficulties on the narrow collapsible cameras.

The invention is based on the fact that avoiding all the above disadvantages, a two size camera can be fitted with the above arrangement in using a mask which is rotatable in the optical axis of the camera being arranged parallel to the film plane. This mask is preferably provided with the same opening as the picture gate frame of the camera corresponding to the desired bigger size, and when this mask is turned by 90°, a smaller size, preferably a square size, is obtained, the edge length of which corresponds to the narrow size edge of the bigger size.

The section of the rotatable mask need not necessarily correspond to the section of the bigger size and could, for example, be bigger according to the desired size of the smaller size.

An embodiment according to the novelty is illustrated in the drawing as applied to a camera with automatic film feed lock which compulsorily switches over to the adjusted size whereby at the same time the finder mask adjustment is coupled with this arrangement, the drawing showing as follows:

Fig. 1—a back view of the camera with its main parts.

Fig. 2—a base view of a film feed locking device and an objective shutter release locking device.

Fig. 3—a corresponding part section of the film feed locking device and of the objective shutter release locking device.

Fig. 4—the release device for the film rewind lock.

On the shaft 2 of the film measuring wheel 1 is fixed the wheel 3. The gears, 5, 6 engage in the gearing 4 of the wheel 3, the shafts 7, 8 of the said gears being fixed to a plate 9. This plate is swingable on the axis 2 of the pin shoulder 10 which on its upper end 12 is quadrangularily formed on the said end on which is disposed a wheel 13. On the plate 9 are rotatably arranged apart from the wheels 5, 6 and 13, also the wheels 14, 15 and the wheel 14 is arranged under the plate 9 its pivot 16 projecting through the plate and having a square ending 17 on which is arranged a wheel 15.

These wheels 14 and 15 are used for operating the counting mechanism which in order to facilitate the illustration are not shown in the drawing. A lower shoulder 19 of the axis 16 projects in a sloped slit 27 of a slide 20 which is slideable on the camera housing wall 22 and the surface 26 of the bearing projection 25. The guide of the slide 20 is operated by means of the slot 29 on the screw 30 and also by the screw 28 of the bearing projection 26. The slide 20 is provided with projections 34, the bending 35 of which is used as finder aperture mask. A suitable forming 37 is arranged on a second slide 36 which is guided by means of slots 38 on studs 39. The forming 37 forms the other picture field aperture of the finder 43. The stud 39 arranged on the left projects at the same time through a further slot 41 of the slide 20.

On the bearing projection 26 is arranged a disc 45 with the gear wheel 46. The disc 45 carries two studs 49 in the range of which is situated a stud 50 of the slide 20. The gear wheel 46 engages in the gearing of a small gear wheel 52 which latter engages with the gearing 54 of a gear wheel 53. This gear wheel is provided with an opening 56 the dimensions of which correspond to the exposure opening of the camera.

Between the slide 36 of the slide 20 is arranged a bellcrank 58 rotatable on the pivot 57 the two lever ends 59 of which engage in the opening 60 of the two slides whereby an inverse movement of the two slides is compulsorily attained.

The arrangement of an oblique slit causes the slide 20 to move the plate 9 in the one or the other direction so that either the gear wheel 5 engages in the gearing of the wheel 63 or the wheel 6 into the gearing of the wheel 64. The gear wheel 3 is disposed on the axis of the film measuring roller 1 so that a different transmission between the film measuring roller and the spool axis 66 according to the position of plate 9 is possible. On this spool axis is arranged the usual locking wheel 88 which after a complete rotation locks a further film feed. For this purpose a disc 70 which is provided with a notch 71 operates with the bending 73 of the locking pawl 72 in such a manner that on meeting of the notch of the disc 70 with the said bending, the pointer 87 of the locking pawl engages into the locking wheel 89. The pawl 72 is provided with a slot shaped opening 74 with the aid of which it is guided on a projection 76 of the plate 77. The shutter release button 79 protrudes through the projection 76 having a shoulder 78 which cooperates with the cone of the pawl 72 and is provided with a second projection 82 through which is secured with the aid of a stud 83 the rectilinear guiding of the projection 80. Additionally a stud 84 is provided on the part 82 which can locate on the surface 85 of the pawl 72. The pawl 72 is under the influence of a spring 86 which endeavours to pull it in the direction of the axis 67. A second pawl 92 is pivoted in 91, the end 89 of the said pawl being formed as locking pawl and engaging into the gearing of the wheel 88 under the influence of a spring 93. The other arm 96 of the pawl is provided with a stud 97 which is disposed in a cam shaped opening 99 of a disc 98 being operable by means of a trigger 100.

The arrangement operates as follows:

When the camera is to be adjusted from a rectangular size to a square size, the gear wheel 46 is turned in an anti-clockwise direction. Thereby are rotated the intermediate gear wheel 52 and the wheel 54 so far until its aperture opening 56 is turned by 90° so that the edges of the said opening form the left and right edges of the picture field whereas the upper and the lower edges are formed by the picture aperture of the camera itself.

On turning of the gear wheel 46, a stud 49 bears at the same time with the stud 59 whereby the slide 20 is slid to the right. The finder picture field is thereby suitably covered by its edge 42 and at the same time the intermediate lever 58 moves the right finder field mask 42 likewise restricting the finder vision field. The size of the finder vision field now corresponds to that of the picture field. With this movement of the slide 20, owing to the oblique slot 27 of the plate 9 the gear wheels arranged thereon are moved in such a manner that the gear wheel 5 engages with the gear wheel 63 so that a suitable higher transmission between the measuring roller gear wheel 4 and the cam disc 70 or the locking wheel 89 is attained in such a manner that on feeding of a small film feed length this disc 70 performs a full rotation. Shortly before the ending of this rotation, the projection 73 of the locking pawl 72 glides down on the edge 71 of the locking wheel 70 so that the pawl pointer 87 engages into the gearing 89 of the locking wheel 88.

On further turning of the film winding knob the pawl 72 is moved to the left until the projection 76 bears on the end 103 of the pawl opening 74 whereby a further film feed is withheld. During this sliding movement the locking pawl liberates the stud 84 so that hereafter the release button 79 of the objective shutter can be operated. During the release button movement the projection 75 presses with its edge 104 against the cone 81 of the pawl 72 swinging the latter on the projection 76 outwardly so that the locking wheel 88 is set free. After the release button is set free, the spring 86 pulls the pawl to the right thereby lifting the projection 102 of the said pawl upon the circumference of the disc 70. The initial position is now restored so that a further film feed is possible. On operating from the square film size to the rectangular size the gear wheel 46 is inversely turned to the location whereby the above described operations succeed in a similar manner and the gear wheel 5 is lifted from the gear wheel 63, however, on the other hand the gear wheel 6 is brought into engagement with the gear wheel 64.

At the same time with this reverse transmission of the gear wheels, the gear wheels 14 and 15 engage into suitable gear wheels of the counting mechanism which are suitably operated according to the corresponding picture size. The pawl 92 is used as film rewind lock. For example, when the film is to be rewound, the trigger 100 is turned in a clockwise direction whereby the pawl on stud 97 is lifted from the gearing of the locking wheel 89 by means of the cam shaped opening 99.

I claim:

1. In a roll holding camera including a camera body, the combination with an exposure frame having an oblong opening therein, of spool chambers on each side of the exposure frame, one for receiving film from the other spool chamber as it is drawn across the exposure frame, a mask plate having an oblong opening of similar size and shape to the opening of the exposure frame, a mount carried by the camera body on which the mask plate may turn adjacent the exposure frame and into two positions, in one of which the openings of the exposure frame and mask plate may register and in the other of which the two sides of the mask plate and exposure frame form an exposure opening smaller than the oblong openings, and means on the camera body for moving the mask plate relative to the exposure frame.

2. In a roll holding camera including a camera body, the combination with an exposure frame having an oblong opening therein, of spool chambers on each side of the exposure frame, one for receiving film from the other spool chamber as it is drawn across the exposure frame, a mask plate having an oblong opening of similar size and shape to the opening of the exposure frame, a mount carried by the camera body on which the mask plate may turn adjacent the exposure frame and into two positions, in one of which the openings of the exposure frame and mask plate may register and in the other of which two sides of the exposure frame and two slides of the mask plate opening form an exposure aperture smaller than the oblong openings, and means for moving the mask plate relatively to the exposure frame from the outside of the camera, a view finder defining an oblong field of view, finder mask plates movably mounted adjacent the view finder, and means connected to the finder mask plates and to the means for moving the mask plate for moving said finder plates to and from an operative position when the mask plate is moved relative to the exposure frame whereby said finder may always define a field of view proportional to the exposure frame.

3. In a roll holding camera including a camera body, the combination with an exposure frame having an oblong opening therein, of spool chambers on each side of the exposure frame, one for receiving film from the other spool chamber as it is drawn across the exposure frame, a mask plate having an oblong opening of similar size and shape to the opening of the exposure frame and a circular periphery, rollers supporting the periphery of the mask plate on which said plate may turn in its own plane to and from registration with the exposure frame whereby oblong or square pictures may be framed according to the position of the masking plate and exposure frame.

4. In a roll holding camera including a camera body, the combination with an exposure frame having an oblong opening therein, of spool chambers on each side of the exposure frame, one for receiving film from the other spool chamber as it is drawn across the exposure frame, a mask plate having an oblong opening of similar size and shape to the opening of the exposure frame, and a circular periphery, gear teeth on the circular periphery, a plurality of pinions meshing with the gear teeth of the mask to rotatably mount the mask plate, a manually adjustable member mounted to be operated from the exterior of the camera and connections between said manually adjustable member and a pinion for moving the rotatably mounted mask plate.

5. In a roll holding camera including a camera body, the combination with an exposure frame having an oblong opening therein, of spool chambers on each side of the exposure frame, one for receiving film from the other spool chamber as it is drawn across the exposure frame, said exposure frame defining the maximum exposure aperture, a mask plate, a mounting carried by the camera body for rotatably supporting said mask plate adjacent the exposure frame, said mask plate having an aperture of the same size and shape as that defined by the exposure frame, whereby edges of the said mask plate opening may define with portions of the exposure frame an area of less than maximum, and means for moving the mask plate relative to the exposure frame from the outside of the camera, a view finder of a shape defining a view in proportion to the size of the exposure frame, masking members operably mounted adjacent the finder frame, and means operative by the means for moving the mask plate for moving the finder masking members to and from each other for automatically adjusting the field of view.

6. In a roll holding camera including a camera body, the combination with an exposure frame having an oblong opening therein, of spool chambers on each side of the exposure frame, one for receiving film from the other spool chamber as it is drawn across the exposure frame, a masking plate including an aperture of similar size and shape to the exposure frame rotatably mounted adjacent the frame and including means for varying the size of the exposure frame through rotation of said plate, a view finder mounted on the camera, slidably mounted finder masking plates carried by the finder to cover parts of the view finder to change the size of the field of view, and connections between the masking plate and the finder masking plates including a single manually operable member, movement of which may change the size of the exposure frame and may also correspondingly alter the field of view.

7. In a roll holding camera including a camera body, the combination with an exposure frame having an oblong opening therein, of spool chambers on each side of the exposure frame, one for receiving film from the other spool chamber as it is drawn across the exposure frame, a masking plate including an aperture of similar size and shape to the exposure frame rotatably mounted adjacent the frame and including means for varying the size of the exposure frame through rotation of said plate, a view finder, slidably mounted finder masking plates to cover parts of the view finder to change the size of the field of view, a slidable lever carrying one masking plate and operably connected to the other masking plate to move said finder masking plates to and from each other, a single manually operable member connected to the mask plate in the camera and a connection between said member and the slidable lever whereby movement of the manually operable lever both adjusts the camera exposure frame opening and the field of view in the view finder.

8. In a roll holding camera including a camera body, the combination with an exposure frame having an oblong opening therein, of spool chambers on each side of the exposure frame, one for receiving film from the other spool chamber as it is drawn across the exposure frame, means adjacent the exposure frame for altering the size of an exposure made therethrough and comprising a circular plate including an aperture of similar size and shape to the exposure frame, rollers movably supporting the circular plate, a finder, means adjacent the finder and outside of the camera for altering the size of the field of view, operable connections between the means adjacent the exposure frame and the means adjacent the finder whereby one can only be operated with the other, and a manually operable member extending outside the camera and included in said connections for simultaneously adjusting the field of view and the size of the exposure frame.

AUGUST NAGEL.